United States Patent
Sutardja

(10) Patent No.: US 7,656,605 B1
(45) Date of Patent: Feb. 2, 2010

(54) METHOD FOR REPEATABLE RUN-OUT COMPENSATION

(75) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 185 days.

(21) Appl. No.: 11/471,174

(22) Filed: Jun. 19, 2006

Related U.S. Application Data

(60) Provisional application No. 60/729,677, filed on Oct. 24, 2005, provisional application No. 60/798,479, filed on May 8, 2006.

(51) Int. Cl.
*G11B 5/596* (2006.01)
(52) U.S. Cl. .................................. 360/77.04; 360/75
(58) Field of Classification Search .................. None
See application file for complete search history.

(56) References Cited

U.S. PATENT DOCUMENTS

| | | | | |
|---|---|---|---|---|
| 5,978,169 A * | 11/1999 | Woods | .................... | 360/77.04 |
| 6,411,461 B1 * | 6/2002 | Szita | ........................ | 360/77.07 |
| 6,437,936 B1 * | 8/2002 | Chen et al. | ............... | 360/77.04 |
| 6,574,067 B2 * | 6/2003 | Chen et al. | ............... | 360/77.04 |
| 6,751,046 B1 * | 6/2004 | Szita et al. | ............... | 360/77.04 |
| 6,847,503 B2 * | 1/2005 | Zhang et al. | ............. | 360/77.04 |
| 6,956,711 B2 * | 10/2005 | Hanson et al. | ........... | 360/77.04 |
| 7,265,933 B1 * | 9/2007 | Phan et al. | ............... | 360/77.04 |
| 7,319,570 B2 * | 1/2008 | Jia et al. | ................... | 360/77.02 |
| 2006/0098330 A1 * | 5/2006 | Takaishi | .................. | 360/77.04 |

* cited by examiner

*Primary Examiner*—Jason C Olson

(57) ABSTRACT

A control system that includes repeatable run-out (RRO) compensation comprises a control module that determines an error of the control system. An RRO compensation module receives the error, determines a repeatable component of an output response of the control system based on the error and a plant model of the control system, and updates a target response of the control system based on the repeatable component of the output response.

42 Claims, 10 Drawing Sheets

METHOD FOR REPEATABLE RUN-OUT COMPENSATION

CROSS-REFERENCE TO RELATED APPLICATIONS

This application claims the benefit of U.S. Provisional Application No. 60/798,479 filed on May 8, 2006 and U.S. Provisional Application No. 60/729,677 filed on Oct. 24, 2005. The disclosure of the above applications are incorporated herein by reference in their entirety.

FIELD

The present disclosure relates to control systems, and more particularly to a control system with repeatable run-out compensation.

BACKGROUND

Referring now to FIG. 1, an exemplary control system 10 includes an input signal X (i.e. a target response of the control system 10), an output response signal Y, and an error signal E. A control module 12 controls the output response signal Y based on the error signal E. The error signal E is a difference between the input signal X and the output response signal Y. In other words, the control module 12 attempts to control the output response signal Y to "follow" the input signal X. The control system 10 can be described as:

$Y=E*H$; and $E=X-Y$, where H represents a transfer function of the control system 10. Each of the values X, Y, and E is a vector that includes values that occur over time.

Referring now to FIG. 2, a control system 20 typically includes a disturbance N (e.g. noise). For example, the disturbance N may be introduced into the control system 20 due to performance, manufacturing, and/or environment imperfections. The disturbance signal N is added to the output response signal Y to model the effects of the disturbance N on the control system 20. The result is a final observable response signal Z. The control system 20 can be described as:

$Y=E*H$;

$Z=Y+N$; and $E=X-Z$.

In other words, due to the presence of the disturbance signal N, the output response signal Y is not observable.

The disturbance signal N may include a random component (e.g. random noise) and/or a repeatable component (e.g. a recurring disturbance due to a constant system imperfection). Typically, effects of a random disturbance signal N are non-correctable. For example, mitigating the effects of a random disturbance signal N may be limited to selecting a different transfer function H and/or changing other parameters of the control system loop.

A repeatable component in the disturbance signal N is referred to as "repeatable run-out" (RRO). For example, a hard disk drive (HDD) is a magnetic data storage medium that includes a rotating disk. A read/write head reads data from the disk and/or writes data to the disk as the disk rotates. When the disk rotates at high speeds, imperfections in the HDD and/or the disk may cause errors in position detection and control of the read and write heads.

SUMMARY

A control system that includes repeatable run-out (RRO) compensation comprises a control module that determines an error of the control system. An RRO compensation module receives the error, determines a repeatable component of an output response of the control system based on the error and a plant model of the control system, and updates a target response of the control system based on the repeatable component of the output response.

In other features of the invention, the RRO compensation module determines a repeatable component of the error. The RRO compensation module includes at least one of a lookup table and a filter module that determines the repeatable component of the error based on the error. The RRO compensation module generates the repeatable component of the output response based on the repeatable component of the error and the plant model. The RRO compensation module includes a correction module that updates the target response of the control system. The correction module generates the target response based on the repeatable component of the output response. The correction module generates a correction value based on the repeatable component of the output response and the correction value is added to the target response. The repeatable component of the output response is multiplied by a filtering coefficient.

In other features of the invention, a storage device includes the control system. The storage device is at least one of a hard disk drive (HDD) and a digital versatile disk (DVD) drive. The storage device comprises a spindle control module that implements the control system. The storage device comprises a VCM control module that implements the control system. The storage device comprises a timing control module that implements the control system. The storage device is at least one of a rotating storage device and a magnetic storage device. The storage device comprises a self-servo write process control module that implements the control system. The RRO compensation module determines a forward transfer function of the control system based on the error and a RRO compensation value.

A control system that includes repeatable run-out (RRO) compensation comprises control means for determining an error of the control system. The control system includes RRO compensation means for receiving the error, for determining a repeatable component of an output response of the control system based on the error and a plant model of the control system, and for updating a target response of the control system based on the repeatable component of the output response.

In other features of the invention, the RRO compensation means determines a repeatable component of the error. The RRO compensation means includes at least one of lookup table means and filter means for determining the repeatable component of the error based on the error. The RRO compensation means generates the repeatable component of the output response based on the repeatable component of the error and the plant model. The RRO compensation means includes correction means for updating the target response of the control system. The correction means generates the target response based on the repeatable component of the output response. The correction means generates a correction value based on the repeatable component of the output response and the correction value is added to the target response. The repeatable component of the output response is multiplied by a filtering coefficient.

In other features of the invention, a storage device includes the control system. The storage device is at least one of a hard disk drive (HDD) and a digital versatile disk (DVD) drive. The storage device comprises spindle control means for implementing the control system. The storage device comprises VCM control means for implementing the control system. The storage device comprises timing control means for implementing the control system. The storage device is at least one of a rotating storage device and a magnetic storage device. The storage device comprises self-servo write process control means for implementing the control system. The RRO compensation means determines a forward transfer function of the control system based on the error and a RRO compensation value.

A method of repeatable run-out (RRO) compensation for a control system comprises determining an error of the control system, determining a repeatable component of an output response of the control system based on the error and a plant model of the control system, and updating a target response of the control system based on the repeatable component of the output response.

In other features of the invention, the steps of receiving the error, determining the repeatable component, and updating the target response are performed at an RRO compensation module. The method further comprises determining a repeatable component of the error. The step of determining the repeatable component of the error is performed by at least one of a lookup table and a filter module. The method further comprises generating the repeatable component of the output response based on the repeatable component of the error and the plant model. The method further comprises updating the target response of the control system. The method further comprises generating the target response based on the repeatable component of the output response.

In other features of the invention, the method further comprises generating a correction value based on the repeatable component of the output response and adding the correction value to the target response. The method further comprises multiplying the repeatable component of the output response by a filtering coefficient. The method further comprises determining a forward transfer function of the control system based on the error and a RRO compensation value.

A computer program stored for use by a processor for operating a control system that implements repeatable run-out (RRO) compensation comprises determining an error of the control system, determining a repeatable component of an output response of the control system based on the error and a plant model of the control system, and updating a target response of the control system based on the repeatable component of the output response.

In other features of the invention, the steps of receiving the error, determining the repeatable component, and updating the target response are performed at an RRO compensation module. The computer program further comprises determining a repeatable component of the error. The step of determining the repeatable component of the error is performed by at least one of a lookup table and a filter module. The computer program further comprises generating the repeatable component of the output response based on the repeatable component of the error and the plant model. The computer program further comprises updating the target response of the control system. The computer program further comprises generating the target response based on the repeatable component of the output response.

In other features of the invention, the computer program further comprises generating a correction value based on the repeatable component of the output response and adding the correction value to the target response. The computer program further comprises multiplying the repeatable component of the output response by a filtering coefficient. The computer program further comprises determining a forward transfer function of the control system based on the error and a RRO compensation value.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
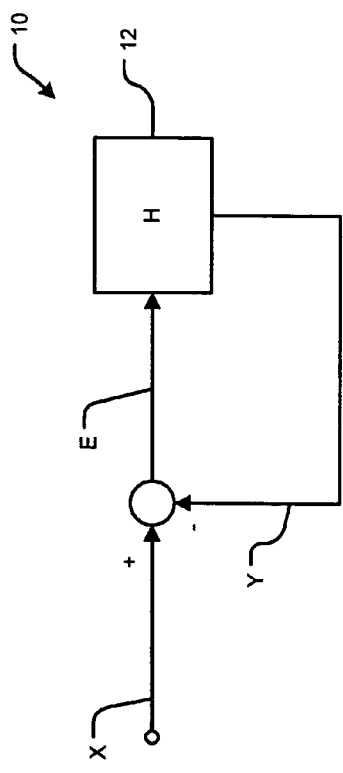
FIG. 1 is a functional block diagram of a control system according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Since RRO is an error signal that is repeated with each rotation of the disk, RRO can be predicted in certain systems such as hard disk drives. The present invention describes an RRO compensation system and method. The RRO compensation system and method includes processing residual error metrics through a plant model of a control system to generate updates to an RRO compensation table. An update algorithm acts on the residual error metric after application of RRO compensation. Consequently, convergence of the algorithm does not rely on an accurate plant model for the system. The RRO compensation method is applicable to control of any system that operates in a repetitive manner.

Figure 2:
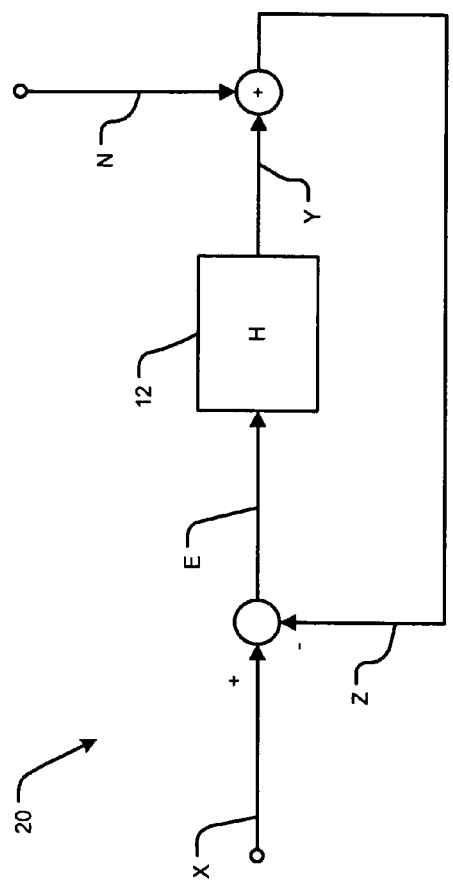
FIG. 2 is a functional block diagram of a control system that includes a noise component according to the prior art.
Figure 3:
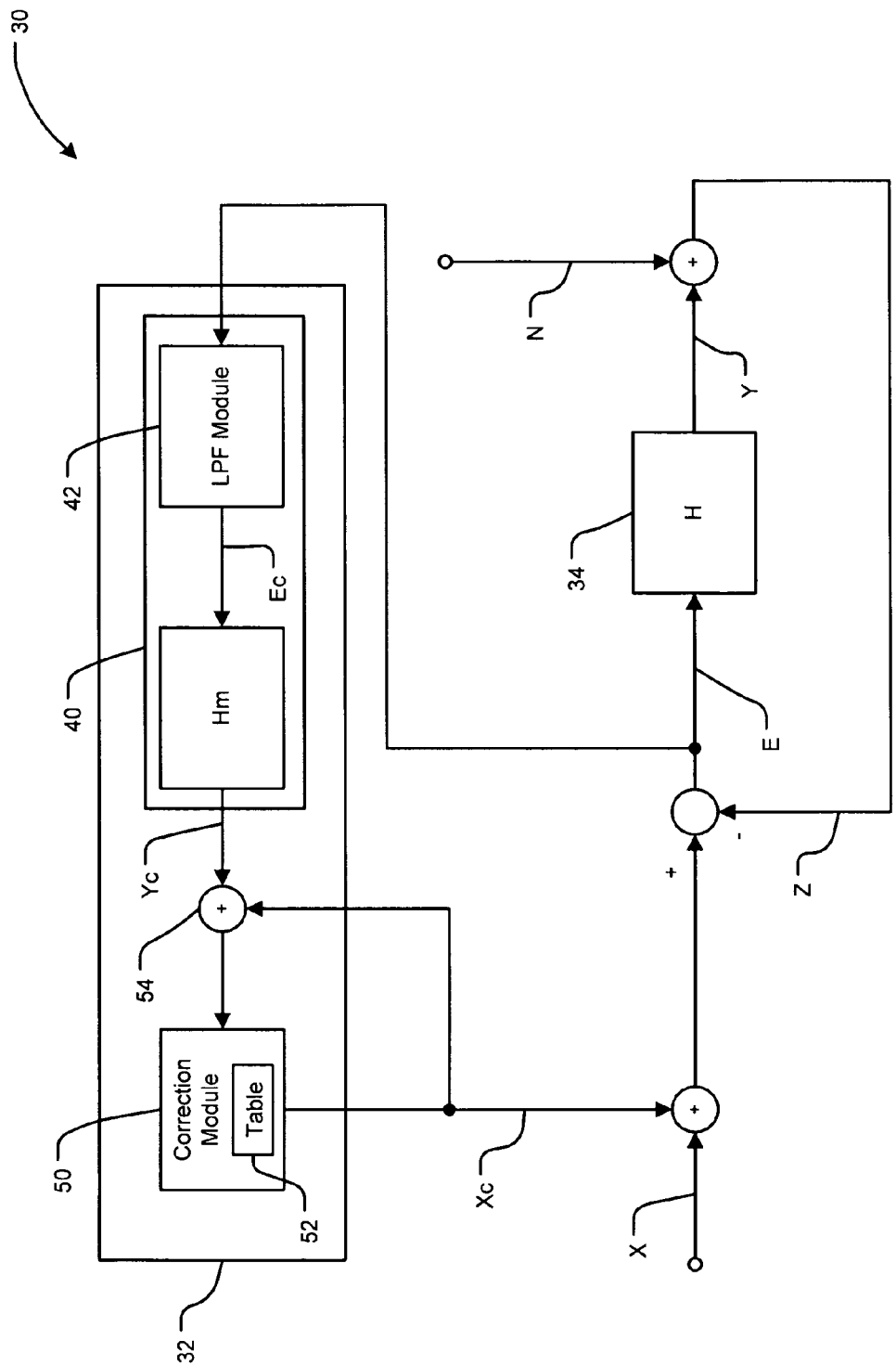
FIG. 3 is a functional block diagram of a control system that includes a repeatable run-out (RRO) compensation module according to the present invention.

Referring now to FIG. 3, a control system 30 includes an RRO compensator module 32. An error signal E is, generally, a difference between an input signal X and a final observable response signal Z. A control module 34 outputs an output response signal Y based on the error signal E. The final observable response signal Z is a sum of a disturbance signal N and the output response signal Y. In contrast to the control system 20 shown in FIG. 2, the error signal E is input to the RRO compensator module 32 and an output (e.g. a correction value Xc) of the RRO compensator module 32 is added to the input signal X. The RRO compensator module 32 generates the output based on RRO of the control system 30 and the error signal E.

For example, the final observable response signal Z includes a repeatable component Zc and a random noise component Zn as follows:

$Z = Zc + Zn.$

Consequently, the error signal E includes a repeatable component Ec and a random noise component En:

$E = Ec + En.$

The repeatable and random noise components are carried over to the output response signal Y:

$Y = Yc + Yn.$

In other words, if the repeatable component Ec is removed from the input (i.e. the error signal E) to the control module 34, the repeatable component Yc is similarly removed from the output response signal Y. The RRO compensator module 32 calculates a correction value (i.e. the output of the RRO compensator module 32) to adjust the input signal X based on the repeatable component Yc. More specifically, the correction value compensates the input signal X by an amount equal to the repeatable component Yc:

$X = X + Yc.$

As noted above with respect to FIG. 2, the output response signal Y is not observable. Consequently, the repeatable component Yc is not observable. The RRO compensator module 32 estimates the repeatable component Yc with a plant model of the system as shown below:

$Yc = Ec*Hm,$ where Hm is the plant model of the system. In the present implementation, the RRO compensator module 32 includes a Yc estimation module 40 that receives the error signal E. The Yc estimation module 40 determines Ec based on the error signal E. The Yc estimation module 40 averages a value of the error signal E over multiple periods to attenuate the random component En to determine the repeatable component Ec. For example, the Yc estimation module 40 includes a lookup table and/or a low pass filter (LPF) module 42 that determines the repeatable component Ec as follows:

$Ec(i) = LPF(E[i]),$ for all values of i in the vector Ec, where i represents individual components of the vector Ec. The repeatable component Ec is input to the plant model Hm to calculate the repeatable component Yc.

A correction module 50 receives the calculated repeatable component Yc and generates the correction value Xc accordingly. For example, the correction module 50 may include a correction value lookup table 52. Correction module 50 outputs a correction value Xc based on the repeatable component Yc and Xc values in the lookup table 52. The correction value Xc is added to the input signal X. Further, the correction value Xc is added to the calculated repeatable component Yc as indicated at 54 to update the lookup table 52 and allow the algorithm to converge. When the plant model Hm and the repeatable component Ec are known exactly, the lookup table 52 becomes accurate (i.e. stores the correct value of the RRO error) after a single update step. When the plant model Hm is not known exactly, the repeatable component Ec is nonetheless reduced after each iteration and the algorithm is convergent.

Figure 4:
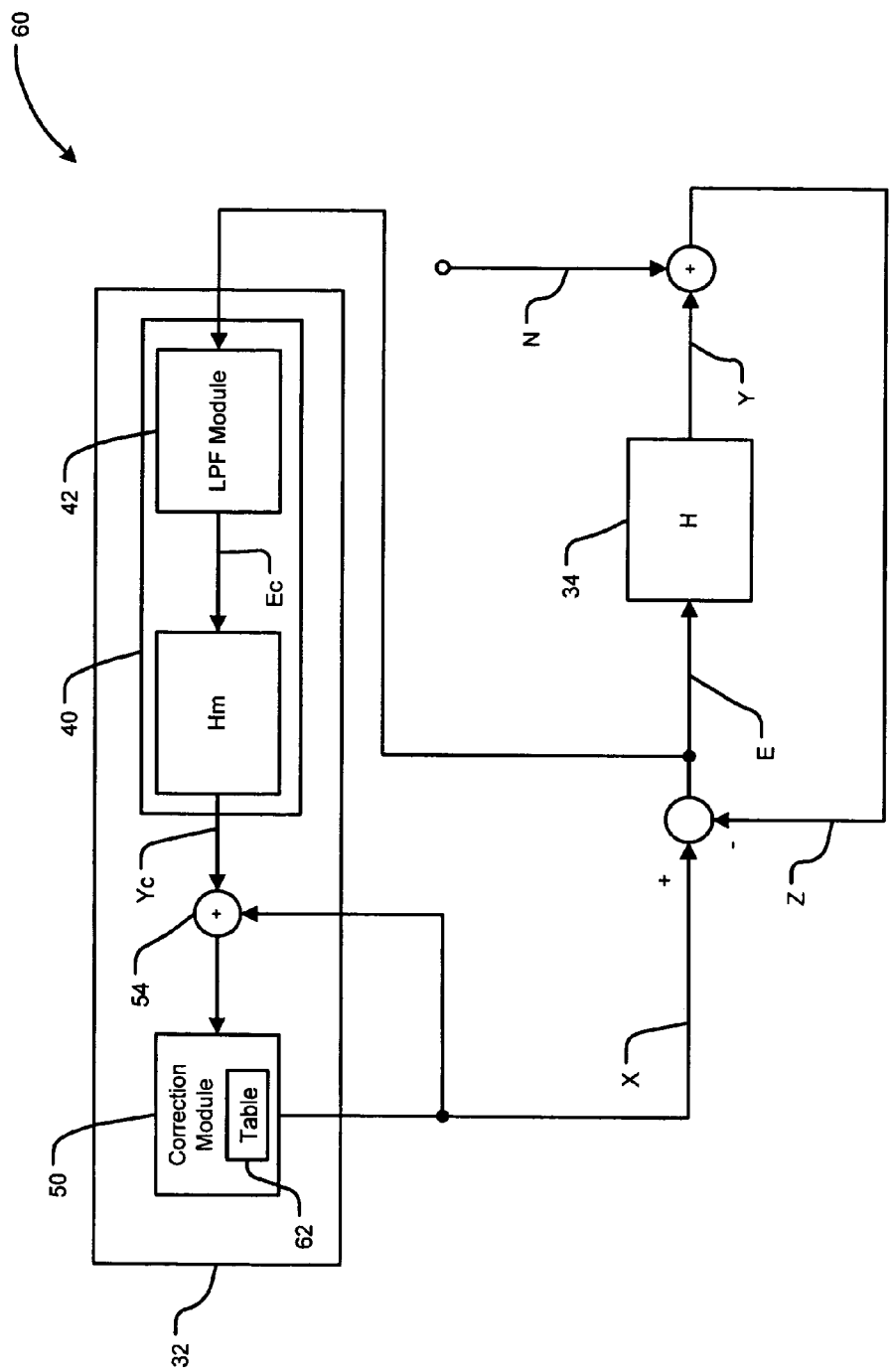
FIG. 4 is a functional block diagram of another implementation of a control system that includes a RRO compensation module according to the present invention.

Referring now to FIG. 4, the RRO compensator module 32 in a control system 60 may include an input signal lookup table 62. The RRO compensator module 32 generates the input signal X according to the calculated Yc and values stored in the input signal lookup table 62. In other words, instead of generating a correction value Xc and adding the correction value Xc to the input signal X, the RRO compensator module 32 directly updates the input signal X according to the calculated Yc.

Figure 5:
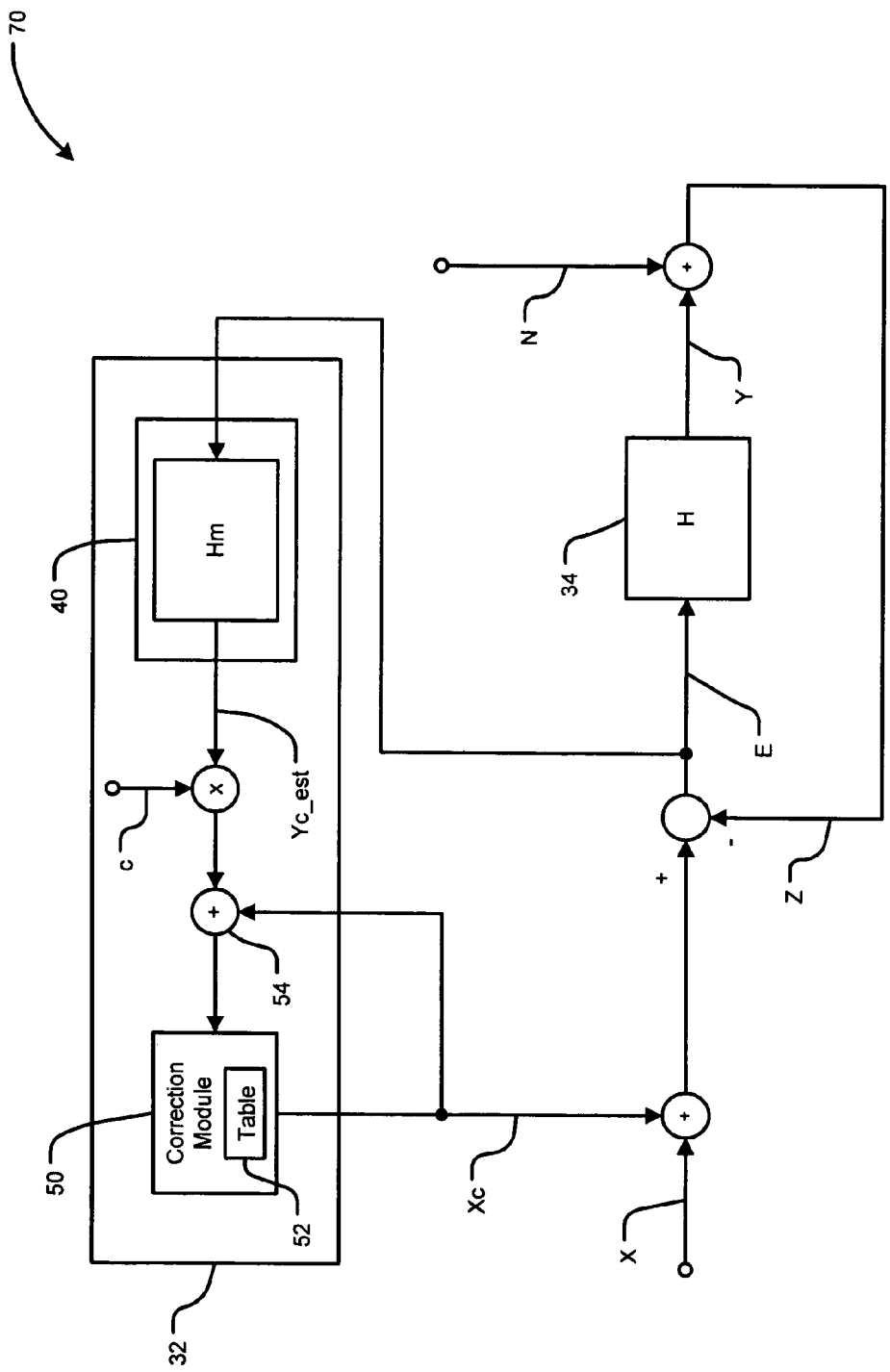
FIG. 5 is a functional block diagram of a control system that includes a RRO compensation module and a filtering coefficient according to the present invention.

Referring now to FIG. 5, the RRO compensator module 32 of a control system 70 may omit the LPF module 42 (as shown in FIG. 4). The plant model Hm receives the error signal E and calculates an estimated Yc according to:

$Yc\_est = E*Hm,$ where Yc_est is the estimated repeatable component Yc of the output response signal Y. The observed value of the error signal E is processed in the plant model Hm to generate Yc_est. The control system 70 multiplies Yc_est by a filtering coefficient c. The filtering coefficient c acts as a low pass filter that causes the system to converge without calculating the repeatable component Ec. In other words, the control system 70 adjusts the input signal X according to:

$X = X + c*Yc\_est.$

Figure 6:
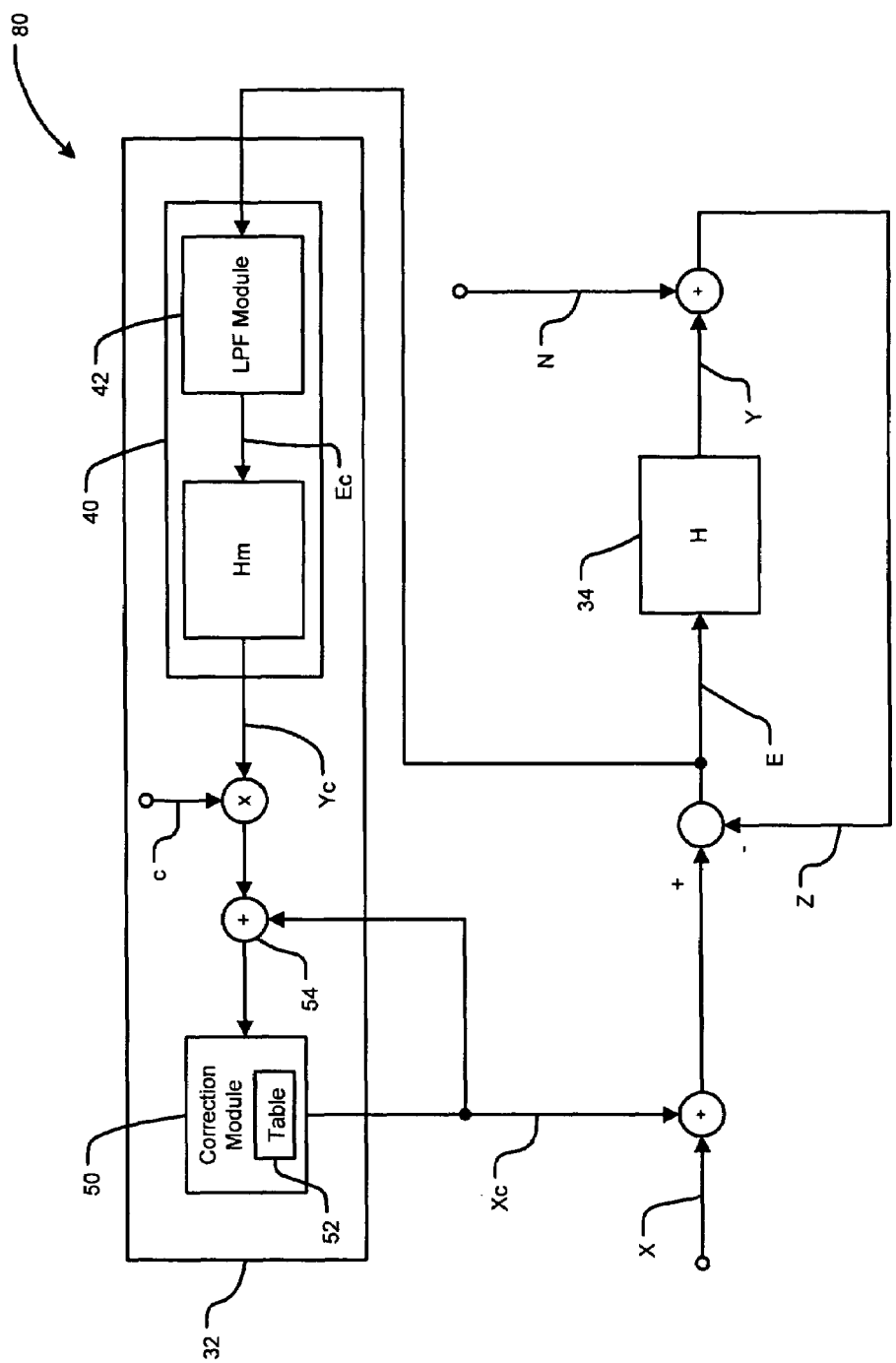
FIG. 6 is a functional block diagram of a control system that includes a RRO compensation module, a filtering coefficient, and a low pass filter module according to the present invention.

Referring now to FIG. 6, a control system 80 includes the LPF module 42 and the filtering coefficient c. In each of the control systems shown in FIGS. 3-6, low pass filtering of at least one of the error signal E and the input signal X allows the respective control system to converge on the proper value. The exemplary control system 80 shown in FIG. 6 includes low pass filtering properties of both the LPF module 42 and the filtering coefficient c.

Figure 7:
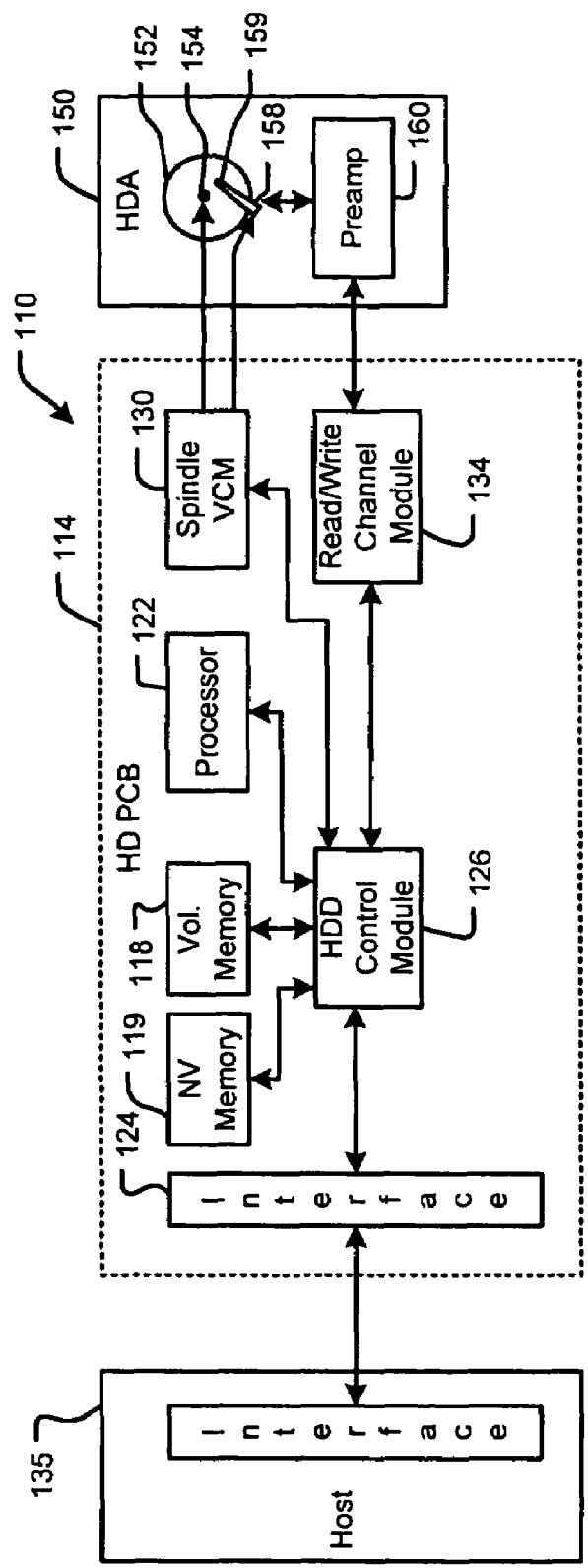
FIG. 7 is a functional block diagram of a hard disk drive (HDD) that implements a RRO compensation method according to the present invention.

Referring now to FIG. 7, an exemplary HDD system 110 that implements the RRO compensator module 32 is shown to include a HDD PCB 114. A buffer 118 stores read, write and/or volatile control data that is associated the control of the HDD system 110. The buffer 118 usually employs volatile memory having low latency. For example, SDRAM or other types of low latency memory may be used. Nonvolatile memory 119 such as flash memory may also be provided to store critical data such as nonvolatile control code.

A processor 122 arranged on the HDD PCB 114 performs data and/or control processing that is related to the operation of the HDD system 110. A hard disk control module (HDC) 126 communicates with an input/output interface 124 and with a spindle/voice coil motor (VCM) driver or module 130 and/or a read/write channel module 134. The HDC 126 coordinates control of the spindle/VCM driver 130, the read/write channel module 134 and the processor 122 and data input/output with a host 135 via the interface 124.

During write operations, the read/write channel module 134 encodes the data to be written onto a read/write device 159. The read/write channel module 134 processes the write signal for reliability and may apply, for example, error correction coding (ECC), run length limited coding (RLL), and the like. During read operations, the read/write channel module 134 converts an analog read signal output of the read/write device 159 to a digital read signal. The converted signal is then detected and decoded by known techniques to recover the data that was written on the HDD.

A hard disk drive assembly (HDDA) 150 includes one or more hard drive platters 152 that include magnetic coatings that store magnetic fields. The platters 152 are rotated by a spindle motor that is schematically shown at 154. Generally the spindle motor 154 rotates the hard drive platter 152 at a controlled speed during the read/write operations. One or more read/write arms 158 move relative to the platters 152 to read and/or write data to/from the hard drive platters 152. The spindle/VCM module 130 controls the spindle motor 154, which rotates the platter 152. The spindle/VCM driver 130 also generates control signals that position the read/write arm 158, for example using a voice coil actuator, a stepper motor or any other suitable actuator.

The read/write device 159 is located near a distal end of the read/write arm 158. The read/write device 159 includes a write element such as an inductor that generates a magnetic field. The read/write device 159 also includes a read element (such as a magneto-resistive (MR) element) that senses the magnetic field on the platter 152. The HDDA 150 includes a preamp circuit 160 that amplifies the analog read/write signals. When reading data, the preamp circuit 160 amplifies low level signals from the read element and outputs the amplified signal to the read/write channel module 134. While writing data, a write current is generated that flows through the write element of the read/write device 159. The write current is switched to produce a magnetic field having a positive or negative polarity. The positive or negative polarity is stored by the hard drive platter 152 and is used to represent data.

Portions of the HDD system 110 may be implemented by a one or more integrated circuits (IC) or chips. For example, the processor 122 and the HDC 126 may be implemented by a single chip. The spindle/VCM module 130 and/or the read/write channel module 134 may also be implemented by the same chip as the processor 122, the HDC 126 and/or by additional chips. Alternately, most of the HDD system 110 other than the HDDA 150 may be implemented as a system on chip (SOC).

RRO signals may affect various subsystems of the HDD system 110. For example, the spindle/VCM module 130 relies on data that is susceptible to RRO effects. The spindle/VCM module 130 controls a speed of the spindle motor 154 to control the rotation speed of the platter 152. The spindle/VCM module 130 uses timing and location (based on platter rotation) of back electromotive force (BEMF) to provide feedback measurements for a spindle speed control system. Multiple motor poles and magnets in the spindle motor assembly cause multiple BEMF signals per revolution of the spindle.

Spacing between the motor poles may be varied as a result of mechanical manufacturing tolerances. Consequently, spacing between the BEMF pulses (i.e. BEMF signals) is varied. Resultant errors are an example of RRO errors. For example, the spindle/VCM module 130 may attempt to control the spindle speed such that measured BEMF signals are equally spaced, temporally. In other words, the spindle rotates at a discontinuous speed to compensate for the varied spacing between the motor poles. Preferably, a constant spindle speed independent of motor pole spacing (i.e. independent of BEMF pulse RRO) is desirable.

The spindle/VCM module 130 also controls the position of read/write heads on the read/write arms 158 via a servo. More specifically, the spindle/VCM module 130 controls a head suspension assembly to position a read/write head as close as possible to a specified track location on the platter 152. During normal drive operation, it is desirable to follow the RRO signal. Conversely, during self-servo writing, it is not desirable to follow the RRO of the servo signal.

Referring now to FIGS. 3 and 7, the control system 30 can be used to model a control system of the spindle/VCM module 130 and the spindle motor 154. For example, the final observable response signal Z may represent a measured time between adjacent BEMF pulses. The input signal X may represent a desired distance between the BEMF pulses. Preferably, the spindle/VCM module 130 controls the speed of the spindle motor 154 so that the error signal E (i.e. $E=X-Z$) is constant for a particular pole spacing (i.e. equal to a vector that represents pole spacing tolerance), notwithstanding minor variances due to random noise and disturbances. When the error signal E is regulated in this manner, the spindle/VCM module 130 does not unnecessarily vary the speed of the spindle motor 154 due to perceived spindle speed error that is caused by BEMF spacing irregularity.

Similarly, the control system 30 can be used to model a control system of the spindle/VCM module 130 with respect to the read/write heads on the read/write arms 158. For example, the final observable response signal Z may represent a head position feedback signal that includes a RRO component. The input signal X may represent a desired head position. The error signal E may represent a position error. Preferably, the control system 30 does not track the RRO component for read/write position applications. In other words, it is desirable to compensate for the RRO component. For example, during self-servo write operations, the control system 30 preferably compensates for the RRO component during final servo track writing. Consequently, the final written servo tracks include minimal RRO effects, thereby improving drive performance during normal operation. In contrast, the control system 30 preferably tracks a RRO component due to disk slip during normal operation. In other words, when the control system 30 tracks the RRO component, RRO compensation is not performed.

The RRO compensation method may be applied to additional HDD applications. For example, during self-servo write processes, a clock signal is locked to disk rotation to write final servo wedges. The disk-locked clock signal (e.g. SSWCLK, or self-servo write clock) is generated based on timing signals that are read from the rotating disk. The timing signals are spaced according to disk rotation. Consequently, imperfections in manufacturing, performance, and/or environment may cause inconsistent spacing between adjacent timing signals. The RRO compensation method of the present invention can be used to remove the resulting RRO component. For high quality self-servo-write, an SSWCLK that locks on to the disk without following any of the repeatable run-out of the timing mark is required. However, there is no available PLL algorithm in the prior-art that can achieve disk-locked clock that does not also follow the repeatable run-outs of the timing marks.

Referring again to FIG. 3, the RRO compensation can also be used to derive a more accurate model of the forward transfer function H of the control system 30. In other words, the control system 30 derives an accurate calculation of the plant model Hm. When the algorithm of the control system 30 converges, the repeatable component Ec is eliminated from the error signal E. Consequently, the repeatable component in the noise N is roughly equivalent to the final converged values of the correction signal Xc (when the input signal X is constant). Without the RRO compensator module 32, the error signal E includes a repeatable error component Ec0. In other words, Ec0 represents the repeatable component error component without any RRO compensation.

The transfer function H is derived as follows:

$$Ec=X-Z; \text{ and}$$

$$Ec=X-(Y+N),$$

where Ec is the repeatable error component including a direct current (DC) term. Ec0 (and Yc0) are repeatable components that do not include a DC term and are represented as follows:

$$Ec0=-(Yc0+Nc),$$

where Nc is the repeatable component of the noise signal N. With RRO compensation, the repeatable component Nc is equivalent to the final correction value Xc in a converged loop. In other words:

$$Ec0=-(Yc0+Xc);$$

$$Ec0=-(Yc0+Xc); \text{ and}$$

$$Ec0=-(Ec0*H+Xc).$$

From the above equations, the transfer function H can then be derived:

$$Ec0*H=-Xc-Ec0$$

$$H=-(Xc+Ec0)/Ec0$$

In other words, when the plant model Hm is an approximation at an initial iteration of the RRO compensation method, further iterations allow the control system 30 to calculate a more accurate transfer function H to replace the initial plant model Hm.

Figure 8:
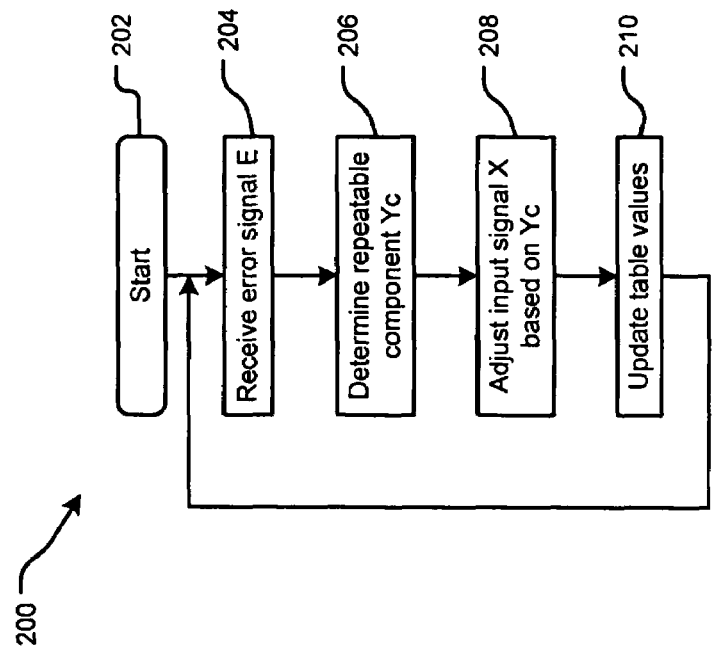
FIG. 8 is a flow diagram that illustrates steps of a RRO compensation method according to the present invention.

Referring now to FIG. 8, a RRO compensation method 200 begins in step 202. In step 204, an RRO compensator module receives an error signal E. In step 206, the RRO compensator module determines a repeatable component Yc of a non-observable output response signal Y based on the error signal E. For example, the RRO compensator module processes the error signal E with a plant model Hm to estimate the repeatable component Yc. Alternatively, the RRO compensator module filters the error signal E to determine a repeatable component Ec and processes the repeatable component Ec with the plant model Hm. In step 208, the RRO compensation method 200 adjusts an input signal X based on the repeatable component Yc. For example, the RRO compensation method 200 adjusts the input signal X by an amount of the repeatable component Yc based on lookup table values. Alternatively, the RRO compensation method 200 determines a correction value Xc based on the repeatable component Yc and lookup table values and adds the correction value Xc to the input signal X. For example, the lookup table values include a previous correction value Xc. In step 210, the RRO compensation method updates the lookup table values.

Figure 9A:
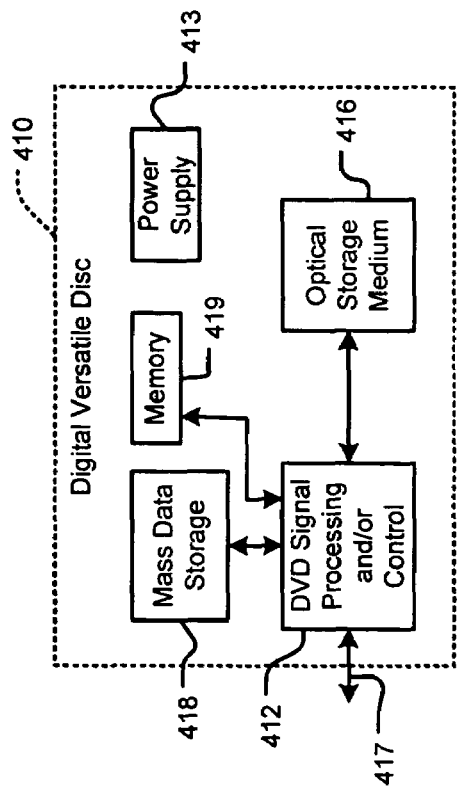
FIG. 9A is a functional block diagram of a digital versatile disk (DVD)

Referring now to FIGS. 9A-9F, various exemplary implementations of the device are shown. Referring now to FIG. 9A, the RRO compensation method can be implemented in a digital versatile disc (DVD) drive 410. The method may implement and/or be implemented in either or both signal processing and/or control circuits, which are generally identified in FIG. 9A at 412, mass data storage of the DVD drive 410 and/or a power supply 413. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 7. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 9C:
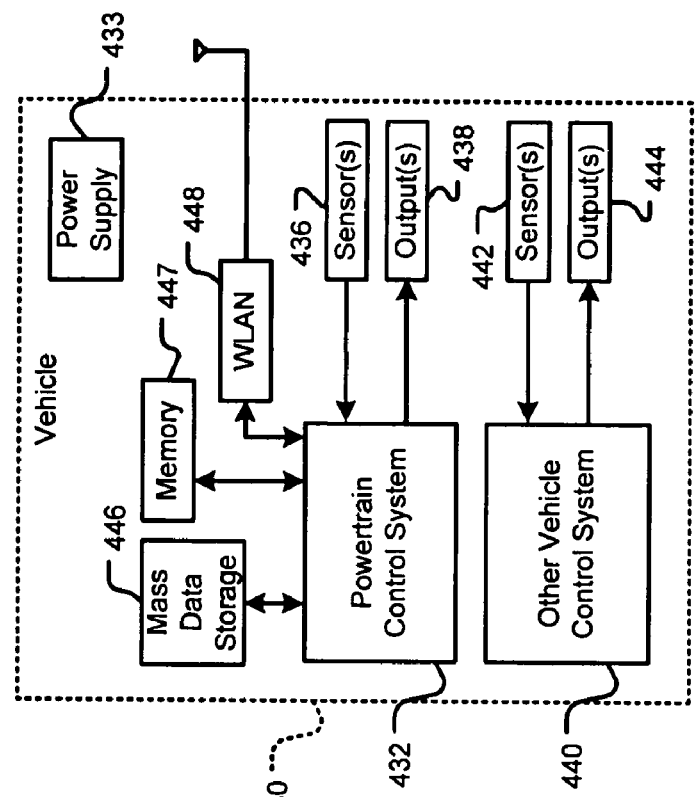
FIG. 9C is a functional block diagram of a vehicle control system.
Figure 9B:
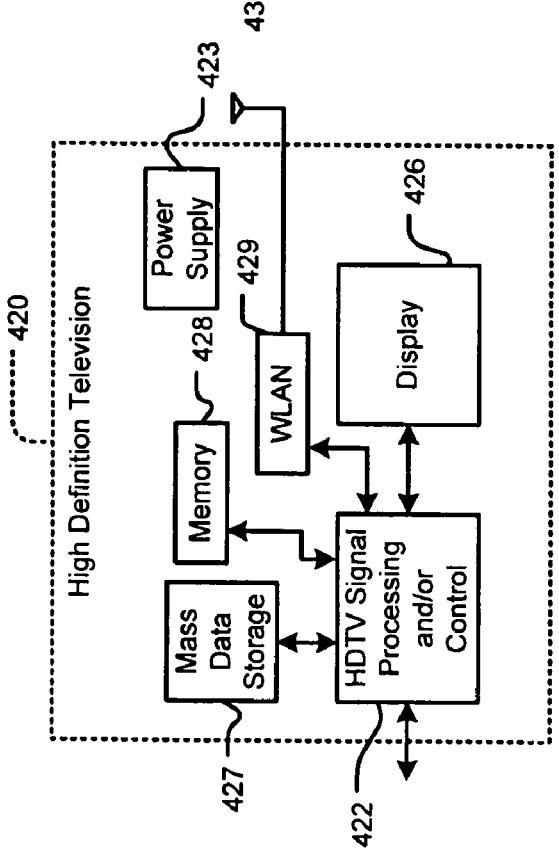
FIG. 9B is a functional block diagram of a high definition television.

Referring now to FIG. 9B, the RRO compensation method can be implemented in a high definition television (HDTV) 420. The method may implement and/or be implemented in either or both signal processing and/or control circuits, which are generally identified in FIG. 9B at 422, a WLAN interface, mass data storage of the HDTV 420 and/or a power supply 423. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 7 and/or at least one DVD may have the configuration shown in FIG. 9A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 9C, the RRO compensation method may implement and/or be implemented in a control system of a vehicle 430, a WLAN interface, mass data storage of the vehicle control system and/or a power supply 433. In some implementations, the method implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The device may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 7 and/or at least one DVD may have the configuration shown in FIG. 9A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 9D:
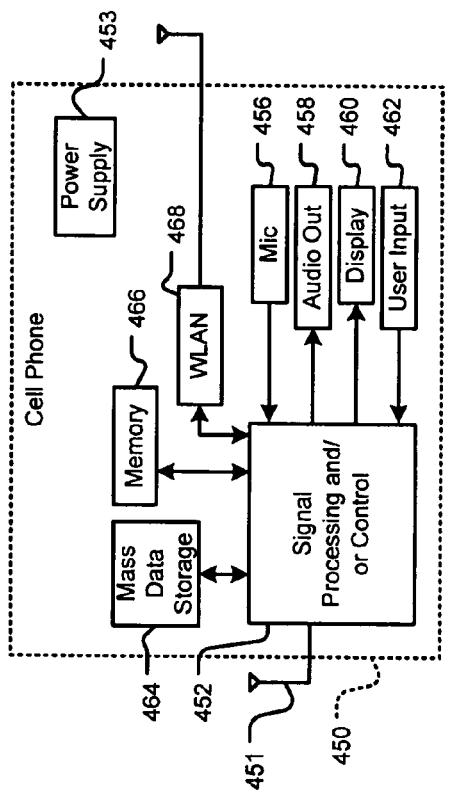
FIG. 9D is a functional block diagram of a cellular phone.

Referring now to FIG. 9D, the RRO compensation method can be implemented in a cellular phone 450 that may include a cellular antenna 451. The method may implement and/or be implemented in either or both signal processing and/or control circuits, which are generally identified in FIG. 9D at 452, a WLAN interface, mass data storage of the cellular phone 450 and/or a power supply 453. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 7 and/or at least one DVD may have the configuration shown in FIG. 9A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 9E:
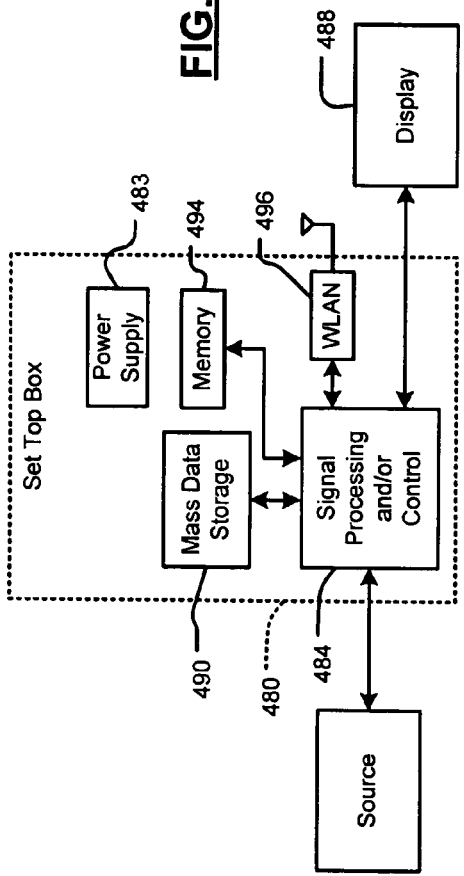
FIG. 9E is a functional block diagram of a set top box.

Referring now to FIG. 9E, the RRO compensation method can be implemented in a set top box 480. The method may implement and/or be implemented in either or both signal processing and/or control circuits, which are generally identified in FIG. 9E at 484, a WLAN interface, mass data storage of the set top box 480 and/or a power supply 483. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 7 and/or at least one DVD may have the configuration shown in FIG. 9A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 9F:
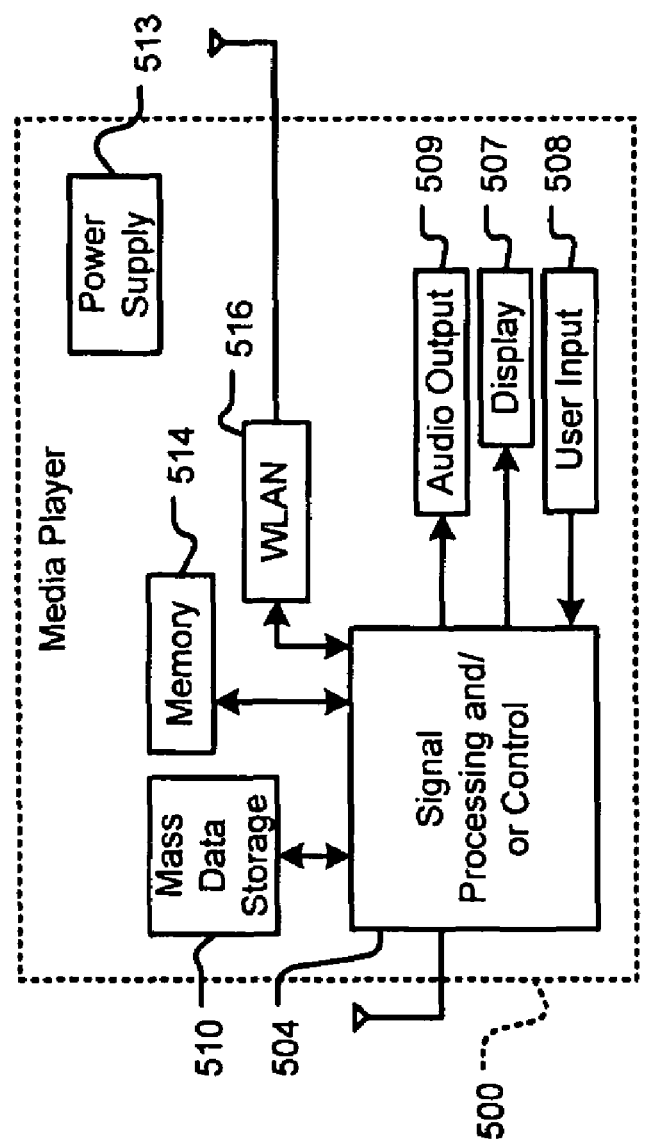
FIG. 9F is a functional block diagram of a media player.

Referring now to FIG. 9F, the RRO compensation method can be implemented in a media player 500. The method may implement and/or be implemented in either or both signal processing and/or control circuits, which are generally identified in FIG. 9F at 504, a WLAN interface, mass data storage of the media player 500 and/or a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 7 and/or at least one DVD may have the configuration shown in FIG. 9A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control system that includes repeatable run-out (RRO) compensation, comprising:
   a control module that determines an error of the control system; and
   an RRO compensation module that receives the error, that determines a repeatable component of an output response of the control system based on the error and a plant model of the control system, that generates a correction value based on the repeatable component, and that updates a target response of the control system based on the correction value to generate an updated target response,
      wherein the updated target response is combined with the output response to generate the error.

2. The control system of claim 1 wherein the RRO compensation module determines a repeatable component of the error.

3. The control system of claim 2 wherein the RRO compensation module includes at least one of a lookup table and a filter module that determines the repeatable component of the error based on the error.

4. The control system of claim 2 wherein the RRO compensation module generates the repeatable component of the output response based on the repeatable component of the error and the plant model.

5. The control system of claim 1 wherein the RRO compensation module includes a correction module that updates the target response of the control system.

6. The control system of claim 5 wherein the correction module generates the target response based on the repeatable component of the output response.

7. The control system of claim 5 wherein the correction module generates a correction value based on the repeatable component of the output response and the correction value is added to the target response.

8. The control system of claim 1 wherein the repeatable component of the output response is multiplied by a filtering coefficient.

9. A storage device that includes the control system of claim 1.

10. The storage device of claim 9 wherein the storage device is at least one of a hard disk drive (HDD) and a digital versatile disk (DVD) drive.

11. The storage device of claim 9 further comprising a spindle control module that implements the control system.

12. The storage device of claim 9 further comprising a VCM control module that implements the control system.

13. The storage device of claim 9 further comprising a timing control module that implements the control system.

14. The storage device of claim 9 wherein the storage device is at least one of a rotating storage device and a magnetic storage device.

15. The storage device of claim 9 further comprising a self-servo write process control module that implements the control system.

16. The control system of claim 1 wherein the RRO compensation module determines a forward transfer function of the control system based on the error and a RRO compensation value.

17. A control system that includes repeatable run-out (RRO) compensation, comprising:
   control means for determining an error of the control system; and
   RRO compensation means for receiving the error, for determining a repeatable component of an output response of the control system based on the error and a plant model of the control system, for generating a correction value based on the repeatable component, and for updating a target response of the control system based on the correction value to generate an updated target response,
      wherein the updated target response is combined with the output response to generate the error.

18. The control system of claim 17 wherein the RRO compensation means determines a repeatable component of the error.

19. The control system of claim 18 wherein the RRO compensation means includes at least one of lookup table means and filter means for determining the repeatable component of the error based on the error.

20. The control system of claim 18 wherein the RRO compensation means generates the repeatable component of the output response based on the repeatable component of the error and the plant model.

21. The control system of claim 17 wherein the RRO compensation means includes correction means for updating the target response of the control system.

22. The control system of claim 21 wherein the correction means generates the target response based on the repeatable component of the output response.

23. The control system of claim 21 wherein the correction means generates a correction value based on the repeatable component of the output response and the correction value is added to the target response.

24. The control system of claim 17 wherein the repeatable component of the output response is multiplied by a filtering coefficient.

25. A storage device that includes the control system of claim 17.

26. The storage device of claim 25 wherein the storage device is at least one of a hard disk drive (HDD) and a digital versatile disk (DVD) drive.

27. The storage device of claim 25 further comprising spindle control means for implementing the control system.

28. The storage device of claim 25 further comprising VCM control means for implementing the control system.

29. The storage device of claim 25 further comprising timing control means for implementing the control system.

30. The storage device of claim 25 wherein the storage device is at least one of a rotating storage device and a magnetic storage device.

31. The storage device of claim 25 further comprising self-servo write process control means for implementing the control system.

32. The control system of claim 17 wherein the RRO compensation means determines a forward transfer function of the control system based on the error and a RRO compensation value.

33. A method of repeatable run-out (RRO) compensation for a control system, comprising:
   determining an error of the control system;
   determining a repeatable component of an output response of the control system based on the error and a plant model of the control system;
   generating a correction value based on the repeatable component;
   updating a target response of the control system based on the correction value to generate an updated target response; and combining the undated target response with the output response to generate the error.

34. The method of claim 33 wherein the steps of receiving the error, determining the repeatable component, and updating the target response are performed at an RRO compensation module.

35. The method of claim 34 further comprising determining a repeatable component of the error.

36. The method of claim 35 wherein the step of determining the repeatable component of the error is performed by at least one of a lookup table and a filter module.

37. The method of claim 35 further comprising generating the repeatable component of the output response based on the repeatable component of the error and the plant model.

38. The method of claim 33 further comprising updating the target response of the control system.

39. The method of claim 38 further comprising generating the target response based on the repeatable component of the output response.

40. The method of claim 38 further comprising:
generating a correction value based on the repeatable component of the output response; and
adding the correction value to the target response.

41. The method of claim 33 further comprising multiplying the repeatable component of the output response by a filtering coefficient.

42. The method of claim 33 further comprising determining a forward transfer function of the control system based on the error and a RRO compensation value.

* * * * *